UNITED STATES PATENT OFFICE.

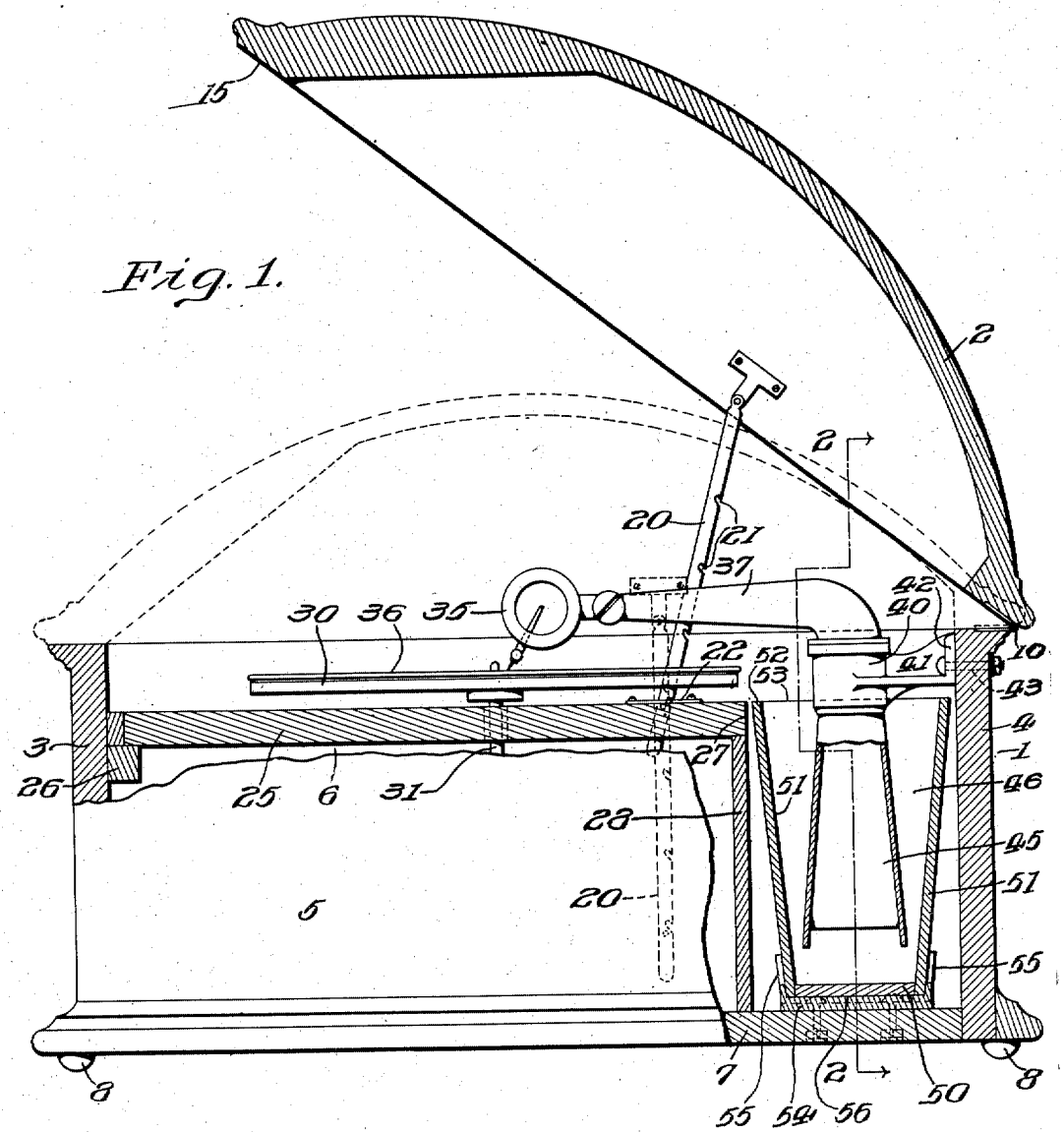

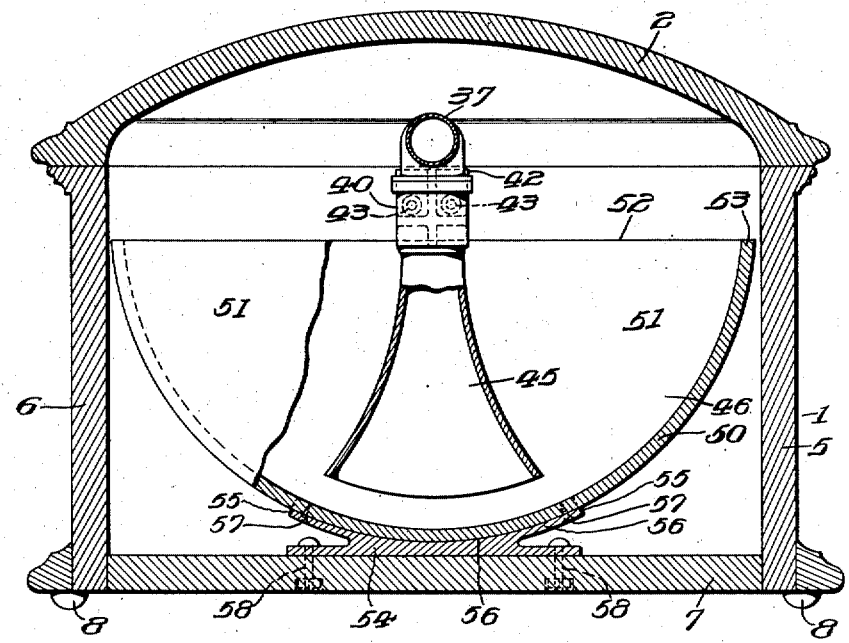

JOHN C. ENGLISH, OF CAMDEN, NEW JERSEY, ASSIGNOR TO VICTOR TALKING MACHINE COMPANY, A CORPORATION OF NEW JERSEY.

TALKING-MACHINE.

1,219,275.  Specification of Letters Patent.  Patented Mar. 13, 1917.

Application filed March 24, 1911.  Serial No. 616,666.

*To all whom it may concern:*

Be it known that I, JOHN C. ENGLISH, a citizen of the United States, and a resident of the city of Camden, county of Camden, and State of New Jersey, have invented certain new and useful Improvements in Talking-Machines, of which the following is a specification.

The main objects of this invention are to provide a compact efficient talking machine; to provide an improved talking machine comprising an inclosing casing having a cover adjustably arranged to deflect sound waves from the machine and having sound amplifying means arranged within the casing and opening to deliver improved sound waves upwardly toward the cover; and to provide other improvements as will appear hereinafter.

In the accompanying drawings, Figure 1 is a fragmentary side elevation, partly in vertical longitudinal section of a talking machine constructed in accordance with this invention; and Fig. 2 is a transverse section on line 2—2 of Fig. 1, looking in the direction of the arrows.

Referring to the drawings, one embodiment of this invention comprises an inclosing cabinet or casing, preferably having comparatively thick wooden walls as is usual and including a substantially rectangular body portion 1 and a cover 2 superimposed thereon.

The body 1 of the casing includes a vertical front wall 3, a vertical back wall 4 parallel to the front wall, two vertical parallel side walls 5 and 6 and a bottom wall 7. The body is preferably mounted on suitable supports 8 depending therefrom.

The cover 2 is preferably connected at its rear edge to the upper edge of the rear wall 4 of the body of the casing by hinges 10 and is preferably exteriorly convex and curved, and interiorly concave in form. The cover is preferably proportioned and arranged to extend over the entire upper end of the body 4 when the cover is closed, the cover having a flat rectangular marginal wall 15, which when closed, rests against the flat upper edges of the vertical exterior walls of the body. The major portion of the inner surface of the cover is curved longitudinally and transversely, but the front portion of the inner surface is preferably substantially flat and has an inclination of substantially 45° to the plane of the lower margin of the cover.

For holding the cover 2 adjustably in position with respect to the body 1 of the casing there is provided any suitable means between the cover and the body, for instance, a link 20 pivotally connected at one end to the underside of the cover and provided with notches 21 spaced longitudinally in one edge thereof, the link being arranged to engage a pin or stop 22 secured within the body of the casing and adapted to engage in the notches.

Inclosed by the body 1 of the casing and spaced below the top thereof is an upwardly removable horizontal substantially rectangular partition 25. The front edge of this partition rests upon a cleat 26 secured against the inner surface of the front wall 3, and the rear edge 27 of this partition is parallel to and spaced forwardly from the back wall 4 of the casing and rests upon the upper edge of a vertical rectangular partition 28 parallel to the back wall and the lower edge of which rests upon and is secured to the bottom 7 of the casing.

Within the body 1 of the casing, below the top thereof and above the horizontal partition 25, is the usual or any suitable horizontal turn-table 30 which is rotatably mounted upon the upper end of a spindle 31 projecting downwardly and rotatably through the partition 25. The spindle 31 is rotated by the usual or any suitable actuating mechanism (not shown) arranged within the casing beneath the horizontal partition 25 and preferably depending therefrom in a well known manner. The horizontal partition 25 and vertical partition 28 coöperate with the front wall 3, side walls 5 and 6 and bottom wall 7 to form a compartment entirely inclosing the actuating mechanism.

Above the turn-table 30 and inclosed by the casing 1, is the usual or any suitable sound box or sound reproducer 35 which is arranged to coöperate with a sound record 36 upon the turn-table 30. The sound box 35 is connected in any well known or suitable manner with the free smaller end of a tapering hollow tone arm 37 which extends rearwardly therefrom with which it communicates.

For supporting the tone arm 37 to swing in a fixed substantially horizontal plane, the larger end of the tone arm is turned longitudinally downwardly through an arc of about 90° and is mounted in any well known or suitable manner to oscillate about a fixed vertical axis upon the upper end of and coaxially with a hollow vertical substantially cylindrical tubular sleeve or bracket 40, preferably made of cast iron or other similar material.

This bracket 40 is secured in a fixed position with respect to the body 1 of the casing by any suitable means; for instance, the bracket may be provided with a lateral extension 41 projecting rearwardly therefrom integral therewith or rigidly secured thereto and terminating in a vertical base plate 42 which is rigidly clamped to the inner surface of the rear wall 4 adjacent the upper edge thereof by means of bolts 43 extending through the base plate 42 and wall 4.

The bracket 40 is preferably arranged with its longitudinal vertical axis substantially midway between the inner surface of the back wall 4 and the opposite surface of the vertical partition 28 and substantially midway between the side walls 5 and 6 of the casing.

For amplifying the sound waves transmitted from the tone arm downwardly through the bracket 40, there depends downwardly from the bracket a downwardly flaring sound conveyer or hollow intermediate amplifying means 45 having a substantially vertical longitudinal axis coincident with the longitudinal axis of the cylindrical portion of the bracket 40.

The downwardly flaring sound conveyer 45 is preferably rigidly connected to the bracket 40 and may be made integral therewith of cast iron or other suitable metal and is preferably substantially circular exteriorly and interiorly at its upper smaller end where it joins the cylindrical portion of the bracket 40 and preferably gradually changes in transverse section exteriorly and interiorly from the circular shape of its upper end to an oblong substantially rectangular shape at its lower or delivery end, the major axis of the delivery end being substantially parallel to the back wall 4 of the casing and the edges of the delivery end being substantially flat and horizontal and spaced above the upper surface of the bottom 7 of the casing.

For the amplification of the sound waves after having been delivered by the intermediate amplifying means 45, there is interposed between the lower delivery end of the intermediate amplifying means 45 and the bottom 7 of the casing, hollow amplifying means 46 surrounding but spaced from the intermediate amplifying means 45 and arranged upon a longitudinal axis coincident with the longitudinal axis of the intermediate amplifying means and diverging upwardly and terminating in an upwardly opening delivery end in a plane substantially flush with the top surface of the horizontal partition 25.

This upwardly diverging amplifying means 46 includes a hollow body or major portion comprising an exteriorly convex and interiorly concave support 50, preferably consisting of a comparatively thick board, curved longitudinally and the longitudinal axis of which is arranged in a vertical plane. The longitudinal edges of this board converge from the ends of the board toward the lower central portion of the board.

A flat comparatively thin substantially semi-circular sounding board 51 is marginally secured to each longitudinal edge of this support 50. The curved edge of each of these sounding boards preferably overlaps or abuts against the corresponding edge of the support and is fixedly secured thereto by any suitable means.

These two sounding boards 51 form the opposite sides of this amplifying means and diverge upwardly, the upper straight edges 52 of these boards being in a horizontal plane with the end edges 53 of the support. The sounding boards 51 and their connecting support, forming the body portion of this upwardly opening amplifying means 46 are mounted in a base plate 54, the upper portion of which is provided with oppositely disposed flanged lateral extensions 55 forming a longitudinally curved concave socket 56 in which the lower portions of the boards 51 and the support 50 fit snugly and are rigidly secured by means of screws 57 passing through the extensions 55 and into the support 50. This base plate 54 is provided with a flat horizontal under-surface which is clamped rigidly against the upper surface of the bottom 7 of the casing by means of bolts 58 or in any other suitable manner. The base plate 54 forms the sole support for the amplifying means carried thereby and which projects freely therefrom.

The upper delivery end of the hollow amplifying means carried by the base plate 54 is preferably substantially rectangular and oblong in shape and is arranged with its major axis substantially horizontal and parallel with the back wall 4 of the casing. This delivery end is preferably proportioned to occupy substantially the full space between the side walls 5 and 6 of the casing and between the vertical partition 28 and the back wall 4 of the casing, but is free from these walls. a substantially rectangular restricted but uninterrupted passage being left between this delivery end and the adjacent walls.

In the operation of this device, it is evident that the sound waves from the reproducer 35 are transmitted and slightly amplified by the tapering tone arm 37, are then transmitted and further amplified by the downwardly flaring conveyer 45 which delivers the sound waves into the upwardly opening amplifying means 46, where a further amplification takes place and from the delivery end of which the sound waves are transmitted upwardly toward and against the inner concave surface of the cover 2 from which the sound waves are deflected forwardly from the casing, the cover also acting to increase the amplification of the sound waves.

Although only a single form has been illustrated in which this invention may be embodied, the invention obviously is not limited to any particular form but may be applied in various constructions without departing from the spirit of the invention or the scope of the appended claims.

Having thus described my invention, what I claim and desire to protect by Letters Patent of the United States, is:

1. In a talking machine, the combination with a casing, of a sound reproducer, a hollow sound conveyer communicating with said reproducer and having a downwardly opening delivery end terminating within said casing, and hollow sound amplifying means arranged within said casing and opposed to and having an outlet surrounding said delivery end, to reverse the direction of sound waves issuing from said delivery end said casing being provided with an angularly adjustable cover arranged to deflect sound waves after delivery by said sound amplifying means.

2. In a talking machine, the combination with sound reproducing means, of a hollow sound conveyer communicating with said means and terminating in a longitudinally straight free delivery end, and hollow sound amplifying means coaxial with the longitudinal axis of said delivery end and opposed thereto, said amplifying means comprising a longitudinally curved support, and a pair of spaced sounding-boards secured to said support and upon opposite sides of said delivery end respectively providing a sound outlet surrounding said delivery end.

3. In a talking machine, the combination with a casing, of a sound reproducer, a hollow sound conveyer communicating with said reproducer and having a delivery end opening downwardly within said casing, and means arranged within said casing and opposed to and having an upwardly facing outlet surrounding said delivery end, to deflect sound waves upwardly from said delivery end, said casing being provided with a cover adjustable to deflect sound waves transmitted by said delivery end.

4. In a talking machine, the combination with a casing, of a sound reproducer, a hollow sound conveyer communicating therewith and inclosed by said casing, said sound conveyer having a delivery end projecting and opening downwardly within said casing, and hollow sound amplifying means including spaced sounding boards inclosed by said casing and surrounding and opposed to said delivery end, and arranged to reverse the direction of sound waves issuing from said delivery end.

5. In a talking machine, the combination with a casing, of means forming a compartment in the front and lower portion of said casing, a rotary record turn-table inclosed by said casing above said compartment, actuating means for said turn-table arranged within said compartment, a sound reproducer arranged within said casing above said turn-table, a hollow sound conveyer communicating with said sound reproducer and having a downwardly facing open delivery end terminating within said casing and below the upper plane of said compartment, hollow sound amplifying means opening upwardly within said casing outside of said compartment and coaxial with and opposed to and surrounding said delivery end and adjustable means adjacent the discharge opening of said amplifying means to direct the sound laterally therefrom.

6. In a talking machine, the combination with a casing, of a sound reproducer inclosed thereby, a hollow sound conveyer communicating with said reproducer and terminating in an open delivery end facing downwardly in said casing, and hollow sound amplifying means within said casing and having an upwardly facing outlet in alinement with said delivery end and opposed thereto, said casing being provided with an angularly adjustable cover arranged to deflect sound waves transmitted thereto from the outlet of said amplifier.

7. In a talking machine, the combination with a casing, of a sound reproducer inclosed thereby, a hollow sound conveyer communicating with said reproducer and terminating in a freely projecting downwardly opening delivery end, transversely oblong in cross section, hollow sound amplifying means within said casing and opposed to said delivery end, said sound amplifying means surrounding the downwardly extending delivery end of said conveyer and having a transversely oblong upwardly opening delivery end and adjustable means adjacent the delivery end of said amplifying means to deflect the sound laterally therefrom.

8. In a talking machine, the combination with a casing, of a sound reproducer inclosed thereby, a hollow sound conveyer communicating with said reproducer and terminating in a freely projecting downwardly opening delivery end fixedly secured to said casing, said delivery end being transversely oblong in cross section, hollow sound amplifying means within said casing and fixedly secured thereto and opposed to said delivery end, said sound amplifying means having an oblong delivery end extending substantially the full distance between the inner surfaces of two opposite exterior walls of said casing and adjustable means extending lengthwise of the delivery end of said amplifying means and adjacent thereto to direct the sound laterally from said amplifying means.

9. In a talking machine, the combination of a casing, an amplifier oblong in transverse cross section arranged in said casing to discharge sound upwardly and arranged across said casing adjacent a vertical wall thereof, a hollow sound conveyer having a delivery end oblong in cross section extending downwardly into said amplifier to a position near the bottom of said amplifier, a cover hinged to a top edge of a wall of said casing to intercept sound waves delivered from said sound amplifier when said cover is raised, and to deflect said sound waves laterally, and means to hold said cover in different adjustable positions.

10. In a talking machine, the combination of a casing, an amplifier increasing in cross section longitudinally arranged transversely in said casing adjacent the rear wall thereof to discharge sound upwardly, a hollow sound conveyer having a delivery end increasing in cross sectional area extending downwardly into said amplifier to a point near the bottom thereof, and a cover hinged to the rear wall of said casing to deflect the sound delivered from said amplifier laterally across the top of said casing.

11. In a talking machine, the combination of a casing, a flattened amplifier within said casing disposed transversely thereto and having its outlet at the top of said casing, a hollow sound conveyer having its delivery end flattened, constantly increasing in cross sectional area and extending downwardly into said amplifier, a cover hinged to a wall of said casing parallel to the longer dimension of the outlet of said amplifier, and means to hold said cover at different angles with respect to the outlet of said amplifier to deflect the sound waves delivered thereto from said amplifier in different directions.

In witness whereof, I have hereunto set my hand this 17th day of March, A. D. 1911.

JOHN C. ENGLISH.

Witnesses:
FRANK B. MIDDLETON, Jr.,
CHARLES F. WILLARD.

It is hereby certified that in Letters Patent No. 1,219,275, granted March 13, 1917, upon the application of John C. English, of Camden, New Jersey, for an improvement in "Talking-Machines," errors appear in the printed specification requiring correction as follows: Page 1, line 14, before the word "sound" insert the word *improved;* same page, line 16, strike out the word "improved"; and that the said Letters Patent should be read with these corrections therein that the same may conform to the record of the case in the Patent Office.

Signed and sealed this 10th day of April, A. D., 1917.

[SEAL.]

F. W. H. CLAY,

*Acting Commissioner of Patents.*

Cl. 274—2.